US008144004B2

(12) United States Patent
Polak et al.

(10) Patent No.: US 8,144,004 B2
(45) Date of Patent: Mar. 27, 2012

(54) METHOD AND APPARATUS FOR CONTROLLING VEHICLE BRAKE LIGHTS

(75) Inventors: Waldemar Polak, Ruda Slaska (PL); Adam Polak, Ruda Slaska (PL); J. Lee Edwards, Sandy Springs, GA (US); Piotr Folkert, Johns Creek, GA (US); M. Lee Jones, Atlanta, GA (US)

(73) Assignee: BLC Paws, LLC, Atlanta, GA (US)

( * ) Notice: Subject to any disclaimer, the term of this patent is extended or adjusted under 35 U.S.C. 154(b) by 419 days.

(21) Appl. No.: 12/593,843

(22) PCT Filed: Mar. 30, 2007

(86) PCT No.: PCT/IB2007/051143
§ 371 (c)(1), (2), (4) Date: Sep. 29, 2009

(87) PCT Pub. No.: WO2008/120045
PCT Pub. Date: Oct. 9, 2008

(65) Prior Publication Data

US 2010/0102946 A1 Apr. 29, 2010

(51) Int. Cl.
*B60Q 1/50* (2006.01)

(52) U.S. Cl. ........ 340/467; 340/464; 340/468; 340/471; 340/479; 340/903; 303/155; 303/163; 303/167; 303/191; 701/71; 701/78; 701/83; 701/91

(58) Field of Classification Search .................. 340/467, 340/464, 468, 471, 479, 903; 303/155, 163, 303/167, 191; 701/71, 78, 83, 91
See application file for complete search history.

(56) References Cited

U.S. PATENT DOCUMENTS 3,528,056 A 9/1970 Veovodsky
3,846,749 A 11/1974 Curry
3,875,559 A 4/1975 Szekessy
5,150,098 A * 9/1992 Rakow .......................... 340/479
5,231,373 A * 7/1993 Freeman et al. .............. 340/469
5,345,218 A 9/1994 Woods et al.
5,565,841 A 10/1996 Pandohie
6,133,852 A * 10/2000 Tonkin .......................... 340/903
6,411,204 B1 6/2002 Bloomfield

FOREIGN PATENT DOCUMENTS

DE 4406339 8/1995
EP 0436368 7/1998
WO WO-2006/035957 6/2006

OTHER PUBLICATIONS

PCT Search Report, "PCT Search Report for PCT/IB2007/051143".

* cited by examiner

*Primary Examiner* — Tai T Nguyen
(74) *Attorney, Agent, or Firm* — Philip H. Burrus, IV

(57) ABSTRACT

The embodiments of the invention are directed to a method and apparatus to generate pulsing lights where parameters such as frequency, degree of brightness, and the number of pulses vary depending on the duration of the brake pedal application, the time interval between consecutive brake applications, and the deceleration rate of the vehicle, as well as optionally its distance from other vehicles. The brake light control system incorporates a microprocessor having multiple inputs, including a brake pedal sensor, and its output connected via an amplifying circuit to the lights. Other inputs of the microprocessor include a deceleration sensor, a distance sensor, and an optional manual pushbutton or switch located within the driver's reach. The lights controlled by the system may include brake lights, emergency lights, or additional lights shaped into a warning triangle.

20 Claims, 8 Drawing Sheets

METHOD AND APPARATUS FOR CONTROLLING VEHICLE BRAKE LIGHTS

CROSS REFERENCE TO PRIOR APPLICATIONS

This application claims priority and benefit under 35 U.S.C. §365 from PCT Application No. PCT/IB2007/051143, filed Mar. 30, 2007, which is incorporated by reference for all purposes.

BACKGROUND

1. Technical Field

The invention relates generally to a method of operating vehicle brake lights, which may include additional lights, the so-called third lights, or emergency or warning lights, and to an electronic system designed to implement this method of control, and more particularly to an improvement in light signaling to vehicles following a vehicle equipped with embodiments of the system as per embodiments of the invention through suitably intermittent, continuous, or modulated operation of brake lights.

2. Background Art

Improving the operation of brake lights is one of the most efficient means of improving road safety and reducing material losses resulting from traffic collisions. Many inventors and car manufacturers have noticed this fact and the importance of the problem and, consequently, the number of ideas and inventions in this area has increased over the last few years.

For example, U.S. Pat. No. 3,914,739B (James Daniel Caughlin; William John Ozeroff) describes a method of operating vehicle brake lights in such a way that, upon applying the brakes, the lights are turned on in an intermittent cycle, first, for example, as a series of three flashes, and then the lights stay on until the brake pedal is released. The control circuit activates a counting and pulsing unit, which generates a few pulses first and then goes into a continuous mode.

Another example is described in PCT application No. WO 00/40434A (Alhassoon, Adel, A.). It presents a system that delays the disconnection of brake lights. This system includes a timer that, after the brake pedal is depressed and released, continues to supply the voltage to brake light bulbs for some time longer. A variant of this solution, disclosed in U.S. Pat. No. 4,806,782B (Patrick J. Bernal), is a brake light control system incorporating a vehicle speed sensor. When the speed is low or continues to decrease, this system keeps supplying the voltage to the brake lights after the brake pedal is released, thus warning the trailing vehicle. At a higher vehicle speed, if there is only slight braking, the brake lights go off immediately upon release of the brake pedal.

U.S. Pat. No. 6,225,981B (Bing Kam) describes an automatic system for control of vehicle brake lights by incorporating a sensor for detecting a car approaching from behind. This system will automatically activate brake lights when the incoming vehicle approaches to a dangerously close distance. If the distance between the vehicles increases sufficiently, the lights will go off automatically unless the brake pedal is depressed at the same time.

PCT application No. WO 01/00444A (Ortiz Aldama, Juan Manuel; et al.) describes another system that controls brake light operation in the case of hard braking or a head-on collision. The system incorporates a negative acceleration (deceleration) sensor, which, upon detecting hard braking, automatically activates pulsating brake lights. The system features a back-up power supply that allows further generation of warning pulses when the electric supply system of the vehicle becomes damaged as a result of head-on collision. A variant of this solution, disclosed in patent application PL 293111A (Kokosza Jan Mieczyslaw; Wenta Marek), is a system equipped with a multi-threshold mercury sensor that increases the intensity of warning as the braking force becomes greater.

Finally, GB 2269493A (Peter William Neale) describes another brake light control system fitted with a sensor detecting both the pressure exerted onto the pedal and the time interval during which this pressure is applied. When preset values of these parameters are exceeded, the system automatically activates emergency lights and warns the driver of a trailing vehicle that a reduction of speed is urgently needed. After the brake pedal is released, the system returns to a normal state of activating the brake lights only due to the brake pedal movement.

The above inventions generally require the application of special sensors and circuits in various positions on the vehicle. This requirement can be quite expensive. Further, mounting these sensors can be difficult, especially when this is not done during vehicle manufacture. Additionally, some of the above inventions create lights where the flashing is too frequent, for example in downtown driving or on congested roads. This may result in excessive eyestrain and impaired perception of the trailing drivers. This adverse effect is a disadvantage of the previously mentioned inventions.

There is thus a need for an improved brake warning system.

BRIEF DESCRIPTION OF THE DRAWINGS

The invention is presented in more detail below, through example waveforms of the current (I) fed to the brake lights for different variants. The symbol T.sub.p denotes the beginning of braking and the symbol T.sub.k denotes the end of braking.

FIG. 1 presents the variant with the value of the current changing between zero and the maximum value I.sub.max, in the pulsating phase while FIG. 2 shows the case when the value of the current pulses initially changes from zero to the maximum I.sub.max and then, gradually, the pulse current ceases to go to zero because the lower value of consecutive pulses rises gradually to the maximum value Imax.

Another set of example waveforms is shown in FIGS. 7-11. These light pulse patterns demonstrate greater use of the variability of three pulse parameters: frequency, duration, and light intensity (amplitude). Four levels of braking are recognized: (1) a light warning tap, (2) moderate braking, (3) hard braking, and (4) maximum braking. In these diagrams, T.sub- .light indicates the initiation of a light warning tap, T.sub.mod indicates the initiation of moderate braking, T.sub.hard indicates the initiation of hard braking, T.sub.max indicates the initiation of maximum braking, T.sub.k indicates the instant of brake pedal release. I.sub.mod, I.sub.hard, I.sub.max indicate intensities of the brake lights corresponding to braking levels 2, 3, and 4. The captions appearing with FIGS. 7-11 explain their meanings.

Figure 8:
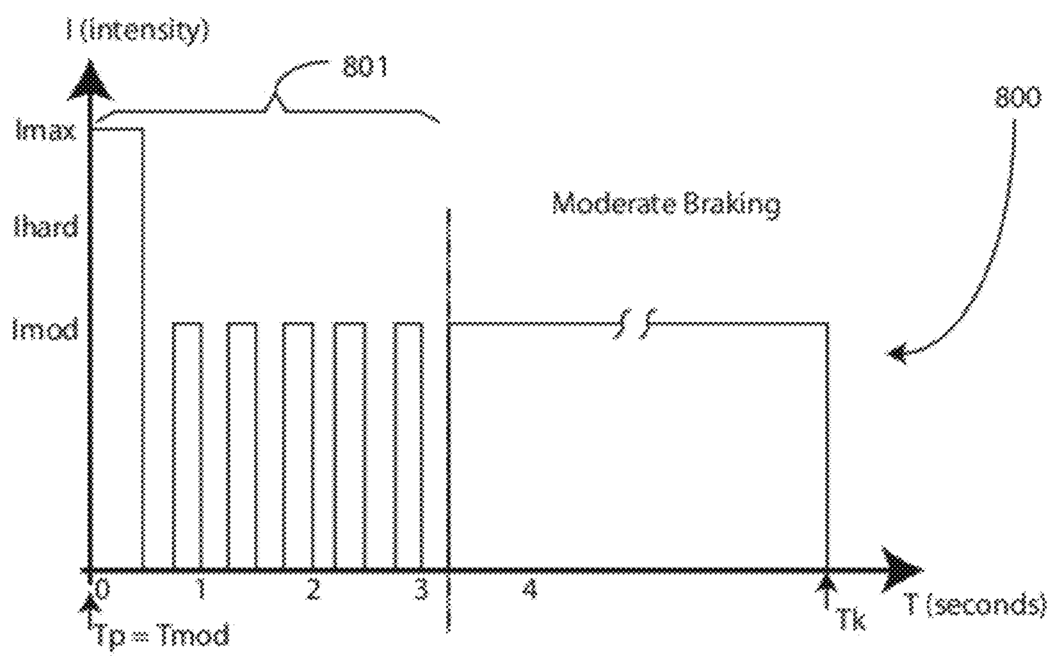

If moderate braking is applied for a few seconds (FIG. 8), then released, and applied again in less than, say, 30 s, the number of pulses is reduced from that shown in FIG. 8 to as few as zero on the third or subsequent applications so that the eyes of the driver of the following car will not be fatigued by too many pulses.

Figure 12:
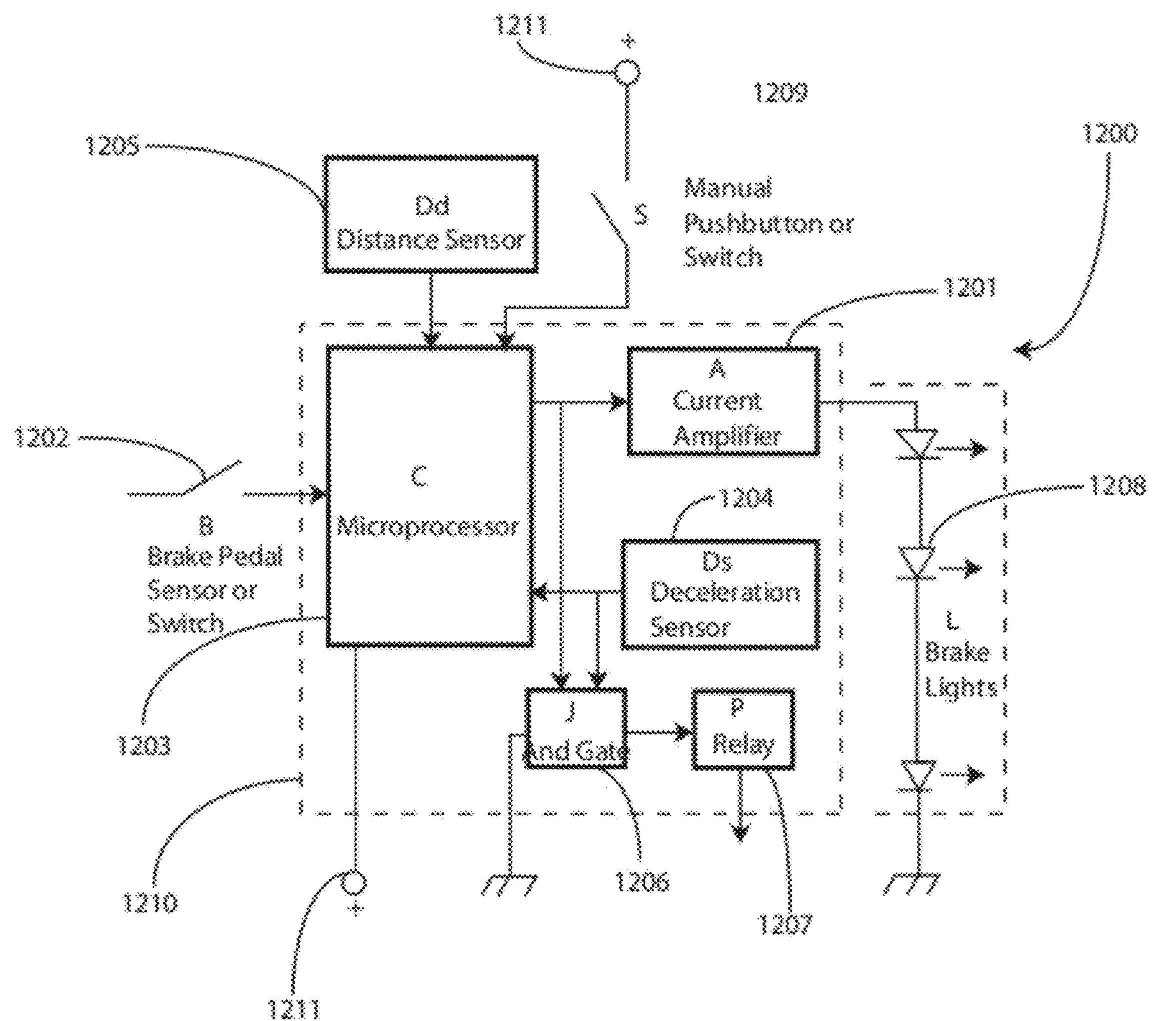

FIG. 12 shows a block diagram of the system as per the invention.

Figure 13:
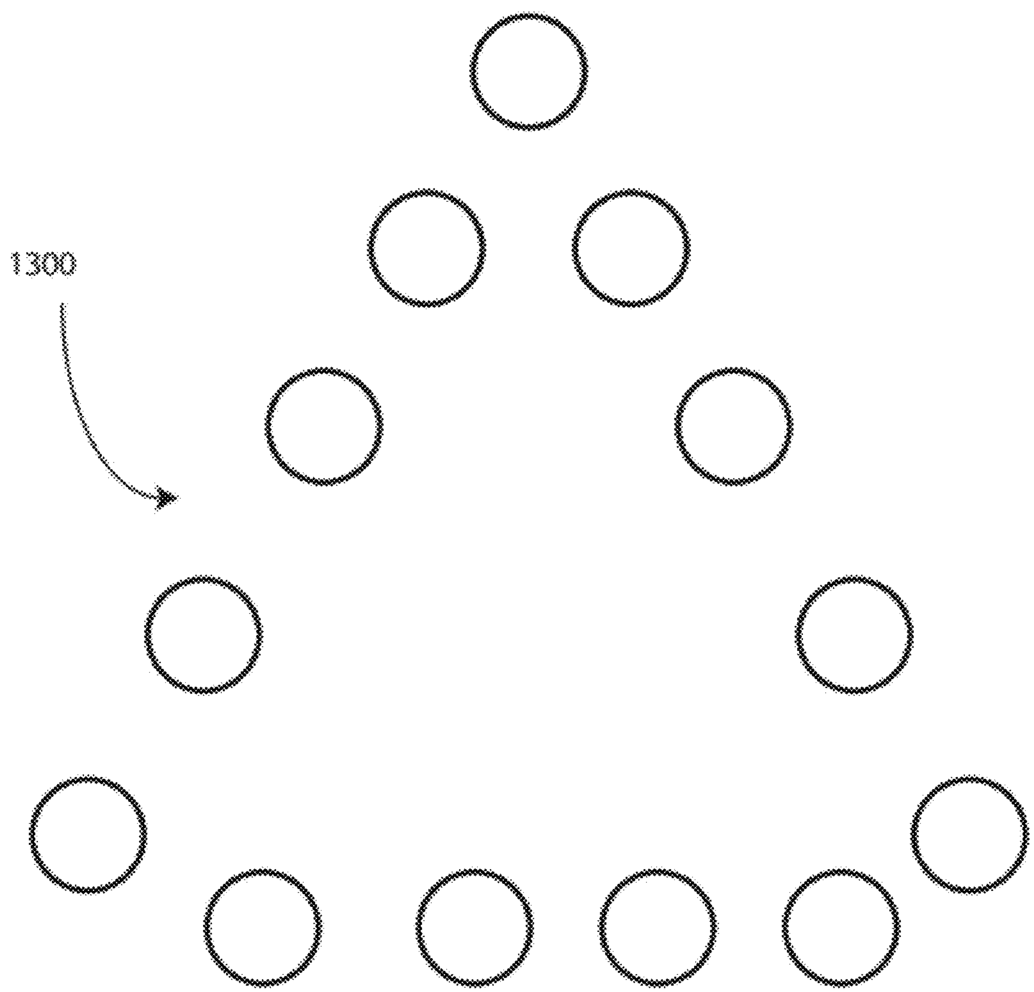

FIG. 13 illustrates a triangle warning configuration of lights.

DETAILED DESCRIPTION OF THE INVENTION

The embodiments of the invention energize luminous elements with a continuous or pulsating current when the brake lights of a vehicle are operated. The parameters of the pulsating phase, such as frequency, amplitude, duration, and number of pulses, vary depending on the length of time a brake pedal is depressed and the time interval between consecutive brake applications. The aim of the present invention is improvement of the perception rate of brake lights with a substantial reduction of eyestrain to the drivers driving behind. It also widens the functionality of brake lights.

In some embodiments of this invention, the parameters of the pulsating phase are dependent on the magnitude of the deceleration rate and the distance from other vehicles. The number of pulses may vary from one to approximately one dozen or more. This number can vary with the number of consecutive brake pedal applications and can be fewer if the time between consecutive brake pedal applications is shorter. Several embodiments of the invention are presented in more detail in FIGS. 1-13. As noted above, the symbol (I) generally denotes current distributed to the brake lights for different embodiments. The symbol T.sub.p generally denotes the beginning of braking and the symbol T.sub.k generally denotes the end of braking, The symbol T.sub.light indicates the initiation of a light warning tap, T.sub.mod indicates the initiation of moderate braking, T.sub.hard indicates the initiation of hard braking, T.sub.max indicates the initiation of maximum braking, T.sub.k indicates the instant of brake pedal release. I.sub.mod, I.sub.hard, I.sub.max indicate intensities of the brake lights corresponding to braking levels of moderate, hard, and maximum, respectively.

With short time intervals between consecutive brake pedal applications, the number of pulses in the pulsating phase can fall to zero in one embodiment. The supply current in the pulsating phase may vary between zero and a maximum value, I.sub.max 101, as shown in waveform 100 of FIG. 1 or, in an alternative embodiment, it may initially change from zero to a maximum value, I.sub.max 201, and then, gradually, the minimum value of each consecutive current pulse can increase from the initial value of zero up to the maximum current, I.sub.max 201, as shown in waveform 200 of FIG. 2.

After the brakes are applied for a short time, with the minimal pressure required to activate the brake light sensor/switch, the current can be distributed in the form of a series of warning pulses at a frequency lower than the frequency occurring for moderate braking. The number of current series warning pulses may be set at three in one embodiment of the invention. This situation roughly corresponds to the driver quickly and repeatedly depressing the brake pedal in order to warn the driver of the vehicle that is following.

In an alternative embodiment of the invention, this series of warning pulses can be activated by a manual pushbutton or switch situated within the driver's reach. When the system detects considerable or sudden deceleration caused by hard or maximum braking, or running into an obstacle, the brake lights are fed with a series of current pulses that are increased in number and frequency. This action can take place regardless of whether the driver has actually depressed the brake pedal or not. In one embodiment of the invention, emergency lights and other lights become activated simultaneously with the brake lights. In another embodiment of the invention, brake lights, emergency lights and other lights may be shaped into and appear as warning triangles. In an additional embodiment of the invention, the generation of the pulsating current for brake lights, emergency lights and other lights is initiated by a vehicle distance sensor.

Now turning to FIG. 12, the vehicle brake light control system is shown. The vehicle brake light control system may include a microprocessor 1203, with inputs from a brake pedal sensor/switch 1202, a deceleration sensor 1204, a distance sensor 1205, and an optional manual push button or switch located 1209 within the driver's reach. The output of the microprocessor is connected through an amplifier 1201 to the brake lights 1208.

In one embodiment of the system, an AND gate/logic product block 1206 is connected to one or more outputs of the microprocessor 1203 and to the deceleration sensor 1204. The output of this AND gate/logic product block 1206 drives a relay 1207 connected to the emergency or additional lights.

Figure 1:
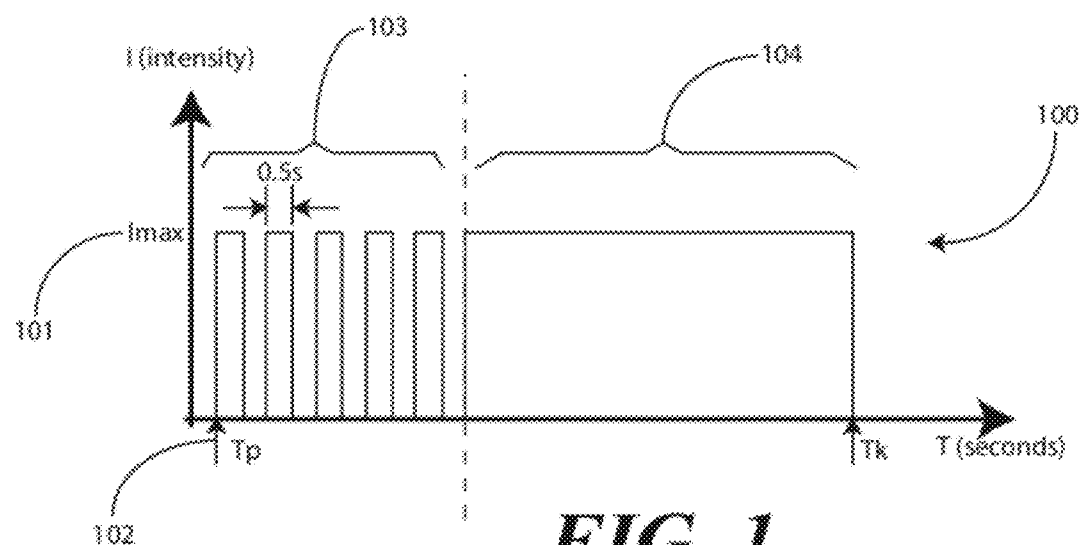
FIGS. 1 and 2 are examples of current waveforms for the case of the ‘first’ brake pedal application, that is, when the time interval between consecutive brake applications has been relatively long, e.g., more than 30 s.
Figure 2:
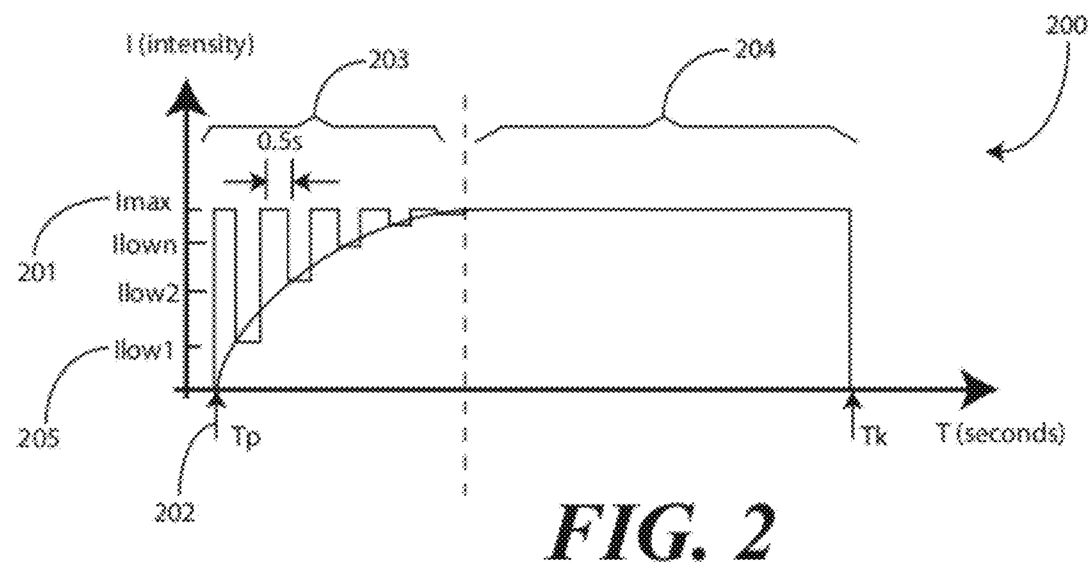

When the brake pedal is depressed at a moment T.sub.p, the brake pedal sensor/switch 1202 becomes activated and sends an electric pulse to the control unit 1210. As a result of this triggering pulse, the microprocessor 1203 generates a waveform of the electric current that is distributed to the brake lights 1208. As shown in FIG. 1, FIG. 2, and FIG. 8 (if intensity is used as a variable parameter), in the first phase, the current is a series of pulses 103 and 203 producing five brake light flashes. Then, the current becomes constant 104 and 204 causing the brake lights to be lit continuously after the pulses 103 and 203 until the brake pedal is released at the moment T.sub.k.

Figure 3:
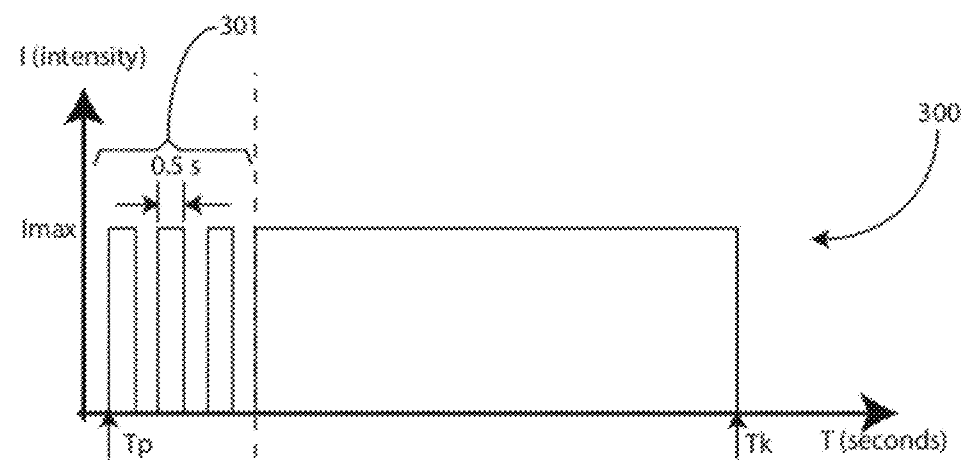
FIGS. 3 and 4 show the light pulse pattern in the case when the time interval between the end of the preceding braking, time T.sub.k, and the start of subsequent braking, time T.sub.p, has been short, e.g., not more than 20 s, whereas FIG. 4 relates to the case when the minimum current value between pulses gradually increases with time.
Figure 4:
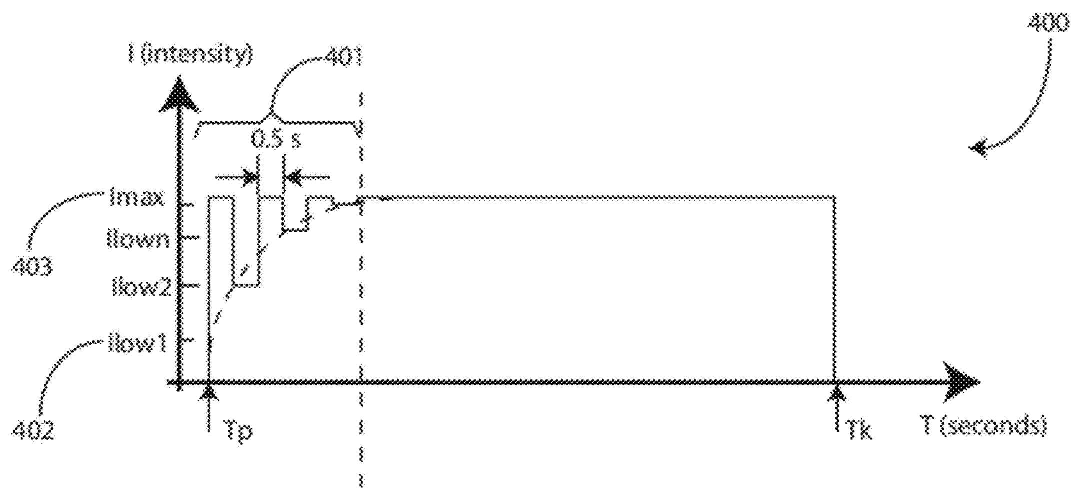
Figure 5:
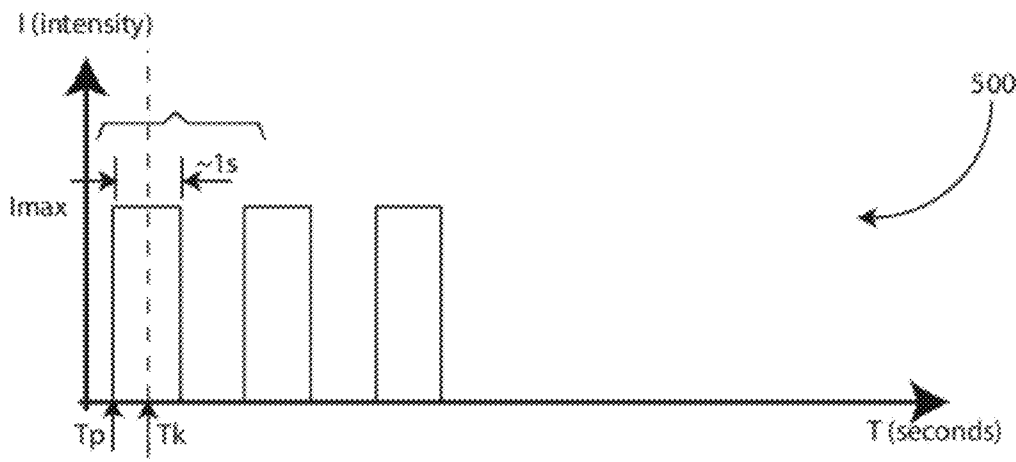
FIG. 5 shows the light pulse pattern used for warning, i.e., when the driver applies the brakes lightly and for a very short time (T.sub.k−T.sub.p is less than 0.5 s). Use of the optional manual pushbutton or switch will also produce the same light pulse pattern.

Because of the flashes, the instant of initial braking is significantly better noticed by the drivers of following vehicles. If, soon after the first braking is complete, at moment T.sub.k, e.g., within 30 s, the next braking takes place, the number of pulses 301 and 401 shown in FIG. 3 and FIG. 4 is appropriately reduced, causing fewer flashes of the brake lights. With repeated braking within a shorter timeframe e.g., within 8 s from the first or the most recent braking, the control unit 1210 may not generate a pulsating current. Rather, the brake lights 1208 may be turned on in a continuous way each time the brake pedal is depressed. As the attention of the drivers driving behind has already been attracted by the flashes occurring at the very beginning of braking, there may be no need to strain their eyes with successive, quickly repeated flashes.

Additionally, if moderate braking is applied for a few seconds, as shown in waveform 800 of FIG. 8, then released and applied again in less than a certain amount of time, e.g, less than 30 s, the number of pulses is reduced from that shown in waveform 800 of FIG. 8 to as few as zero on the third or subsequent applications so that the eyes of the driver of the following car will not be fatigued by too many pulses.

If the brake pedal has been only slightly depressed for a short time, e.g., where T.sub.k minus T.sub.p is less than 0.5 s, then despite the activation of the brake pedal sensor/switch 1202, the braking force resulting from such a short and slight activation of the braking system may be negligible. However, the electric pulse generated by the brake pedal sensor/switch 1202 is nonetheless transmitted to the control circuit 1210, which will generate a series of electric current pulses 500 and 700 (if intensity is used as a variable parameter). These electric current pulses 500 and 700 may produce three relatively slow flashes of the brake lights 1208 with the frequency lower than that described in the previous paragraph. These flashes attract other drivers' attention, especially those driving too closely behind, and urge them to increase their concentration. This additional function of the brake light control system 1200 can replace repeated warning braking, which is frequently used by drivers in order to warn those driving behind that they should increase their vigilance, keep a proper distance, and abandon any attempts to pass due to traffic conditions that may require unexpected braking. The invention makes the realization of this additional function of brake lights more comfortable and without a noticeable reduction in vehicle speed. Alternatively, this warning function may be initiated with the manual pushbutton or switch 1209 that is placed within the driver's reach.

Figure 9:
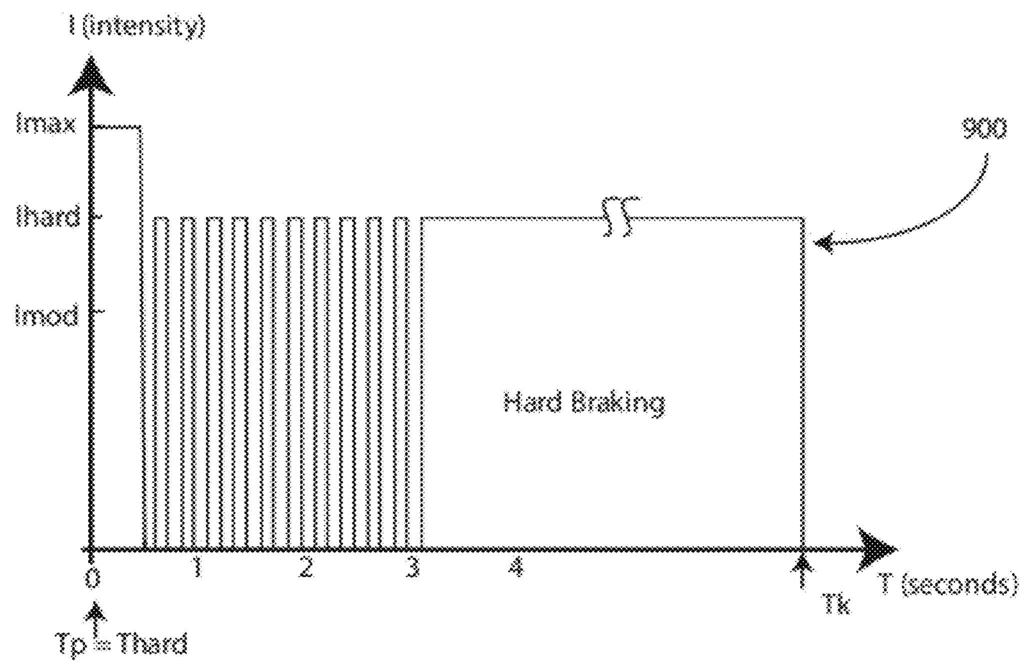

For normal or moderate braking, example light patterns 100, 200, 300 and 400 are shown in FIG. 1 through FIG. 4. If both intensity and pulse frequency are used as variable parameters, FIGS. 8-11 contain sample brake light patterns 800, 900, 1000, 1100. By way of example, FIG. 9 illustrates a sample brake light pattern 900 for hard braking.

Figure 6:
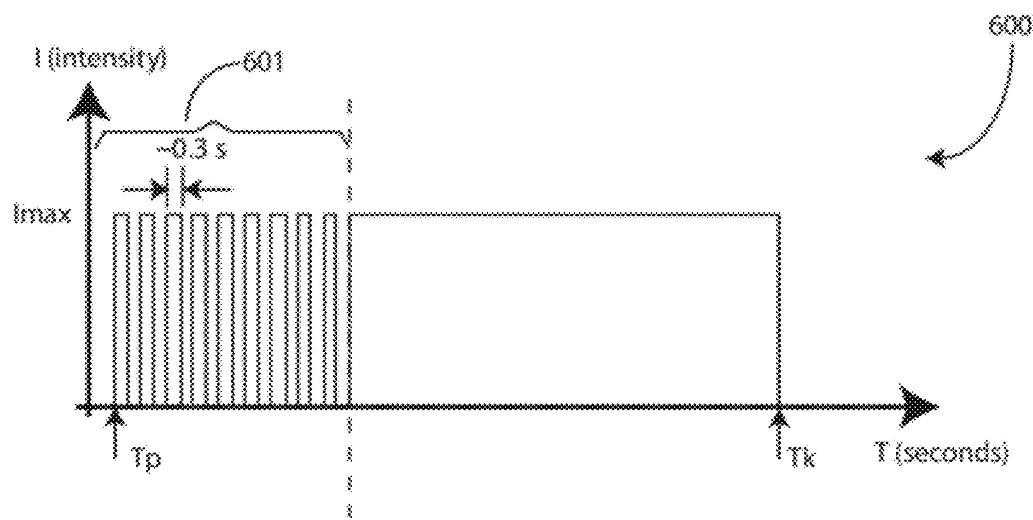
FIG. 6 shows the pattern of brake light pulses that are generated when an abrupt decrease in vehicle speed has been detected, regardless of whether the brake pedal had been depressed or not.
Figure 7:
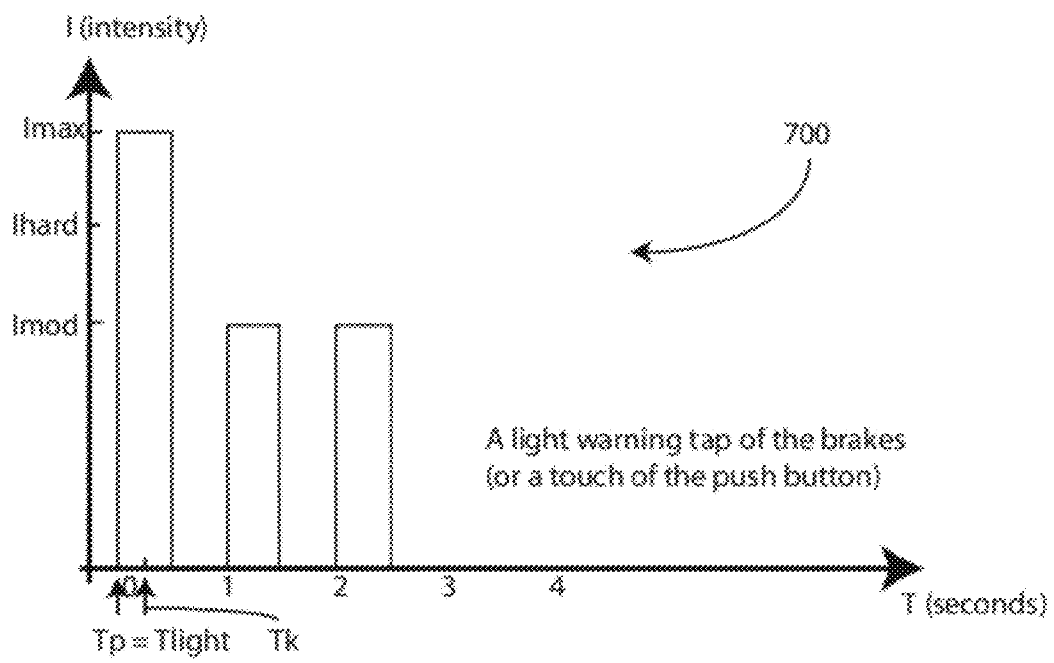
Figure 10:
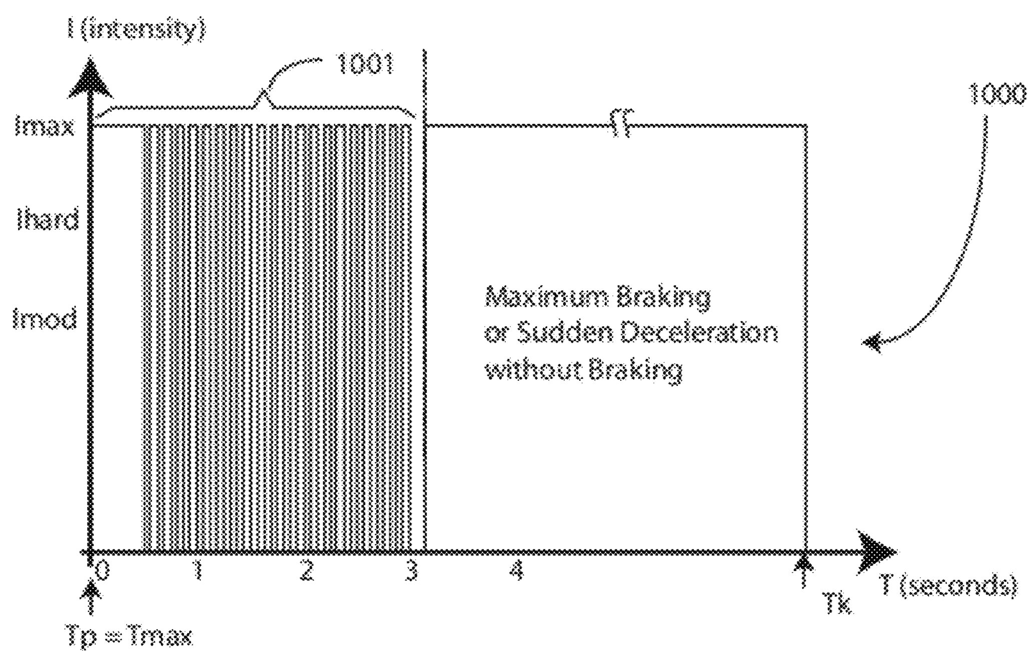
Figure 11:
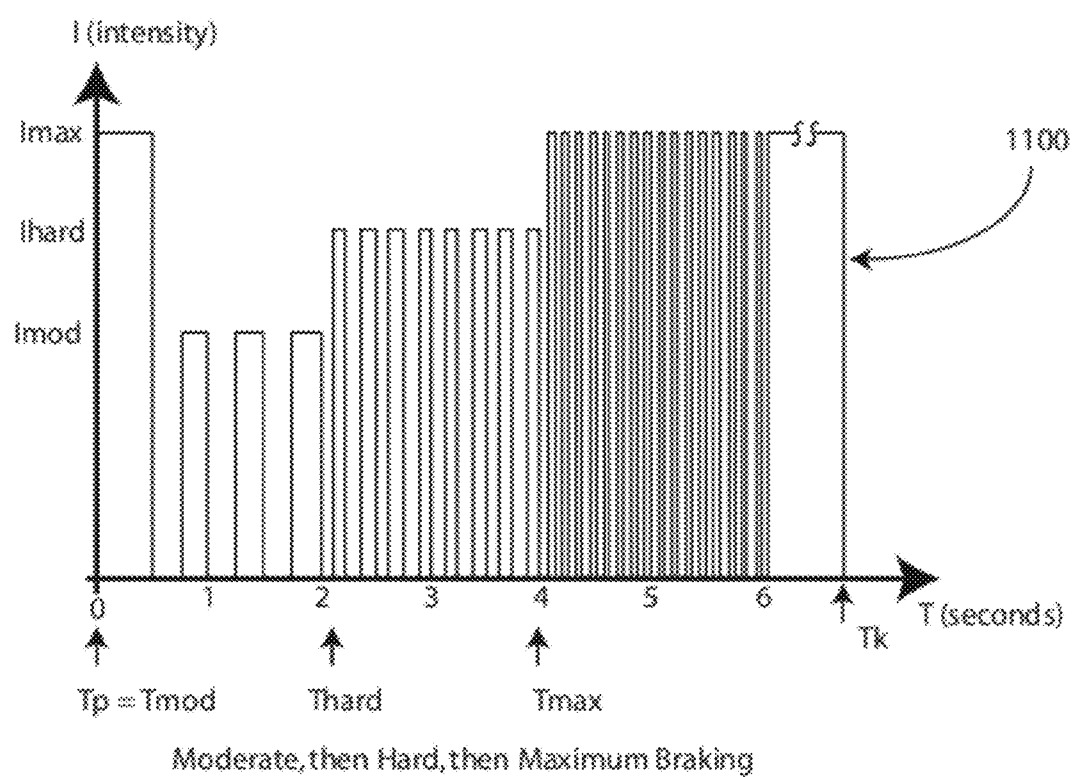

If sudden rapid deceleration of the vehicle is detected due to, for example, maximum braking or crashing into a preceding vehicle or other obstacle, then, regardless of whether the brake pedal has been depressed, the deceleration sensor 1204, which is adjusted to a specified threshold, will cause the control system 1200 to generate a series of rapid flashes of brake lights 1208 as illustrated by current pulses 601 and 1001 (if intensity is used as a variable parameter) in FIG. 6 and FIG. 10, respectively. If the brake pedal has been depressed in the meantime, the brake lights 1208 will continue to be illuminated until the brake pedal is released at the moment T.sub.k. Emergency lights of the vehicle, as well as the actual brake lights and any other lights, may be configured into warning triangles 1300 as shown in FIG. 13. Waveform 1100 of FIG. 11 shows an example waveform for a case in which the driver starts with moderate braking and progressively increases the pressure or braking level.

The electric current generated by the control system 1200 may vary from zero (no illumination) to a maximum amplitude (maximum brightness) shown by waveform 100 and 300 in FIG. 1 and FIG. 3, respectively. Alternatively, the current amplitude may be modulated between a lower value 205 and 402 that rises with time to the maximum amplitude 201 and 403 as shown in FIG. 2 and FIG. 4, respectively. Intermediate levels of amplitude can also be used to indicate different levels of braking (moderate, hard, or maximum) as shown by waveforms 800, 900, 1000, and 1100 in FIG. 8, FIG. 9, FIG. 10 and FIG. 11, respectively.

The control system of FIG. 12, in one embodiment, comprises a microprocessor C 1203 with its input driven by the brake pedal sensor/switch B 1202 and its output connected via a current amplifier A 1201 to brake lights L 1208, which in one embodiment can be made from light-emitting diodes (LEDs). Other inputs of the microprocessor C 1203 can include: a deceleration sensor Ds 1204, a sensor of the distance between vehicles Dd 1205 and, optionally, a manual pushbutton or switch S 1209 to initiate warning pulses. The output of the microprocessor C 1203 can also be connected, together with the output of the deceleration sensor Ds 1204, to an AND gate/logic product block J 1206, whose output drives a relay P 1207 that turns on the emergency or additional lights of the vehicle.

The control system 1200 can be powered from the vehicle's battery 1211. The main components of the control system 1200 may be mounted in a small housing. The control system 1200 may be connected to the electric system of any vehicle. The deceleration sensor 1204 can be electronic or mechanical.

One embodiment of the invention includes brake lights 1208 made from semiconductor light-emitting diodes (LEDs). The signalization of these lighting elements is more distinct because their luminance can be easily varied over a wide range and their switching speed is much faster than that of filament lamps. Due to their superior reliability, this type of brake light is being used more and more often in modern cars. The control system 1200 may be used to control only the so called third (central) brake lights. If filament lights are used with the embodiments of the invention rather than LEDs, the pulse frequencies shown in FIGS. 8-11 should be reduced by a factor of approximately 2 to allow for the slower switching time (on/off time) of filament lamps. The way and the device as per the invention shall find application to the operation of the brake lights of road and highway vehicles of all types, including automobiles, trucks, buses, motorcycles, trailers, etc.

What is claimed is:

1. A method of operating the brake lights, comprising:

feeding one of a continuous or pulsating current having a frequency, amplitude, and number of current pulses that vary depending on a duration of brake application and a time interval between consecutive brake applications;

wherein lights become activated in response to the one of the continuous or pulsating current.

2. The method of claim 1, wherein the frequency, amplitude, and the number of current pulses increase with an increase in a rate of vehicle deceleration.

3. The method of claim 2, wherein the number of pulses is between zero and a dozen, further wherein the number of pulses between consecutive brake pedal applications is smaller than the number of pulses during continuous brake pedal applications.

4. The method of claim 1, wherein the brake application comprises activation of a manual pushbutton or switch situated within a driver's reach.

5. The method of claim 1, wherein the lights comprise one of emergency lights or other lights and become activated simultaneously with the brake lights in response to the one of the continuous or pulsating current.

6. The method of claim 1, wherein one of the brake lights, emergency lights, or other lights are shaped as warning triangles.

7. The method of claim 1, wherein the pulsating current is initiated by a vehicle distance sensor.

8. A method of controlling operation of a brake light assembly, comprising:

detecting a braking parameter from an electric actuation pulse of a brake sensor with a control unit;

generating, with the control unit, a current waveform in response to the detecting the braking parameter; and causing, with the current waveform, a plurality of lights in the brake light assembly to pulse in accordance with the current waveform;

wherein the current waveform comprises a combination of a pulse frequency corresponding to the braking parameter, a duty cycle corresponding to the braking parameter, a duration corresponding to the braking parameter, an amplitude corresponding to the braking parameter, and a number of pulses corresponding to the braking parameter.

9. The method of claim 8, wherein the braking parameter comprises a deceleration rate.

10. The method of claim 9, wherein the pulse frequency and the amplitude increase simultaneously in a tiered manner with an increase in the deceleration rate.

11. The method of claim 8, wherein the braking parameter comprises a duration during which the brake sensor is actuated.

12. The method of claim 8, wherein the braking parameter comprises a time interval between a first actuation of the brake sensor and a successive application of the brake sensor.

13. The method of claim 8, wherein the braking system comprises a manual push button switch coupled with the brake sensor.

14. The method of claim 8, comprising detecting the braking parameter with distance sensor configured to detect a distance corresponding to one or more of surrounding vehicles or obstacles.

15. The method of claim 8, wherein the brake light assembly comprises lights configured as warning triangles.

16. A brake light control system, comprising:

a braking system comprising a brake sensor coupled to one of a manual push button switch or a brake pedal; and a control unit coupled to the braking system;

wherein the control unit is configured to control a plurality of lights in response to input from the braking system to flash in accordance with a control signal comprising a frequency, an amplitude, a duration, and a number of pulses corresponding to the input;

wherein the plurality of lights are arranged as a warning triangle.

17. The brake light control system of claim 16, further comprising a distance sensor coupled to the control unit, wherein the control unit is configured to control the plurality of lights in response to the input from the braking system and an additional input from the distance sensor.

18. The brake light control system of claim 16, wherein the plurality of lights is one or more of brake lights, emergency lights, or additional lights.

19. The brake light control system of claim 16, wherein the input comprises a deceleration rate, wherein the frequency and the amplitude both increase with an increase in the deceleration rate.

20. The brake light control system of claim 16, wherein the input comprises a time interval between a first application of the braking system and a successive application of the braking system.

* * * * *